United States Patent [19]
Furusawa

[11] 3,807,686
[45] Apr. 30, 1974

[54] VALVE UNIT

[76] Inventor: Minoru Furusawa, 6-16, Kiba 5 Chome, Kotoku Tokyoto, Japan

[22] Filed: Mar. 15, 1973

[21] Appl. No.: 341,705

[30] Foreign Application Priority Data
Mar. 18, 1972 Japan.......................... 47-27884

[52] U.S. Cl.................................. 251/43, 251/30
[51] Int. Cl. ...................... F16k 31/383, F16k 31/40
[58] Field of Search.......................... 251/30, 35, 43

[56] References Cited
UNITED STATES PATENTS
2,426,900  9/1947  Parker ................................ 251/43
3,757,821  9/1973  Fujiwar............................ 251/30 X Primary Examiner—Arnold Rosenthal
Attorney, Agent, or Firm—Dale R. Small

[57] ABSTRACT

Construction of a valve comprising a valve casing having an inlet opening defined by a flange and communicated with an outlet opening, said flange serving as a main valve set and surrounded by an outer rim serving also as a main valve seat; a pressure cylinder provided with a central port in center of said valve casing; a chamber positioned upward said port and connected with said port through a pilot valve adapted for opening and closing said port intermediately; a piston valve positioned below said port and rotatably mounted within the lower chamber and including a center port and peripheral ports; and a flexible duct mounted within said piston valve.

1 Claim, 5 Drawing Figures

PATENTED APR 30 1974 3,807,686

VALVE UNIT

BRIEF DESCRIPTION OF THE DRAWINGS

Objects and features of the invention will be apparent from the following detailed description of a specific embodiment thereof, when read in conjunction with the accompanying drawings in which.

DETAILED DESCRIPTION OF THE IVENTION

This invention relates to a pilot valve of a compact and simplified construction mounted within a fluid passage and capable of smoothly and positively controlling the fluid flow in spite of considerable fluid pressure fluctuations by making the best of the fluid pressure and a small external force.

With self-controlled valves of the type actuated by the pilot valve, the pilot valve actuating unit can be made more compact and the valve can be opened and closed with less power consumption than in the case of the directly actuated valves. On the other hand, the pilot valve itself is large-sized and complicated and a considerable labor is required not only in the manufacture but in the repair and inspection. Various proposals were made in the past to simplify the valve construction, but the simplified valve construction often led to the lowered pressure-resistancy and durability of the valve and the lowered valving operation as a function of the fluid pressure.

The object of this invention is to obviate these drawbacks and to provide a simplified valve construction having higher pressure-resistancy and durability and excellent valving operation and capable of smoothly and positively controlling the fluid flow over a wide range of fluid pressure fluctuations in spite of the small and simple design of the valve.

A preferred embodiment of this invention will be described below by referring to the accompanying drawing.

Figure 1:
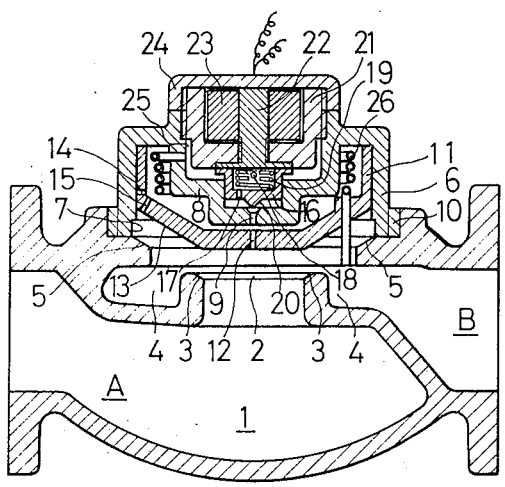
FIG. 1 is a longitudinal sectional view of the electromagnetic valve embodying the present invention, the valve being shown in the opened position.
Figure 2:
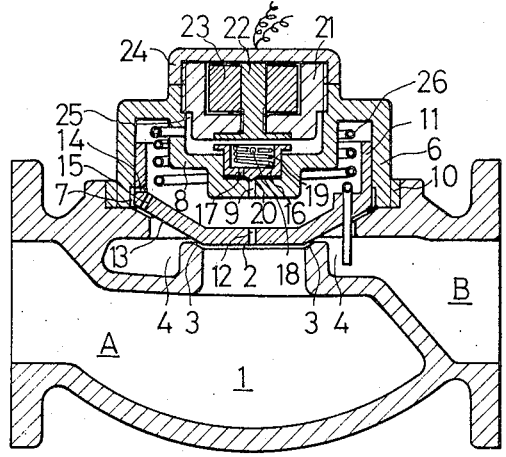
FIG. 2 is a longitudinal sectional view of the same electromagnetic valve, the valve being shown in the position immediately preceding its closure.

FIGS. 1 and 2 show an embodiment of the present invention as applied to electromagnetic valves.

Valve casing 1 has a circular flange 3 defining a fluid inlet opening 2 communicated with a fluid inlet passage A and a fluid outlet opening 4 into a fluid outlet passage B, and a circular rim 5 lying in the same level as the circular flange 3 or in a horizontal plane at a higher level than the circular flange 3. Both the rim 5 and the flange 3 are used as main valve seats. A pressure cylinder 6 has a skirt portion having an enlarged diameter section at the lower end 7 and a stepped top wall 8 of a generally downwardly convex shape having a center bore 9. The cylinder 6 is threaded fluid-tight to said casing 1 by its threaded portion 10 around the circular rim 5 with the inlet opening 2 as center. A piston valve 11 disposed rotatably within the cylinder 6 has a valve head surface directed towards the inlet 2 and having a central bore 12 of a slightly lesser diameter than the bore 9, and a valve head periphery 13 adapted to sealingly and pressingly abut on the rim 5 and the flange 3 when the valve head closes the rim 5 and the flange 3. The valve head periphery 13 and the wall contiguous thereto are provided respectively with an adjustment port 15 and one or more pressure-reducing ports 14, the latter ports being provided in a position facing to the enlarged diameter section 7 of the pressure cylinder 6 when the valve head is about to contact pressingly with the flange 3 (FIG. 2). A pilot valve 16 is formed as a small-size piston valve made of magnetizable material having an offset bottom port 17 and a side port 18. Said pilot valve 16 is slidably disposed within a smaller recess on the upper surface of the top wall 8 and normally urged to downwards under the force of a spring 19 to close the bore 9 by a small projection 20 formed on the bottom surface thereof. An electromagnetic coil casing 21 has a protective cover 24 and a stationary core 22 around which an electromagnetic coil 23 is fitted, and is threadedly attached to the valve casing so that a chamber 25 may be defined within a recess on the upper surface of the top wall 8. A flexible duct 26 having a larger inner diameter than the diameter of the bore 9 and formed as a fine metal tube wound into a coil or a soft plastic tube is disposed inside the piston valve 11 and sealingly passed through the valve head surface so as to interfere in no way with the smooth operation of the piston valve 11 and provide hydraulic connection between the chamber 25 and the outlet 4.

The valve of the present invention operates as follows: The fluid supplied under pressure through the inlet passage A to the inlet 2 pushes the piston valve open by its own pressure and the major part of the fluid flows into the outlet passage B through the outlet opening 4, while the minor part of the fluid flows into the piston valve 11 through port 12. Assuming that the coil 23 is energized and the pilot valve 16 is attracted to the core 22 to open the bore 9, as shown in FIG. 1, the fluid supplied into the piston valve 11 is discharged partly through port 9, ports 17, 18, chamber 25 and flexible duct 26 into the fluid outlet 4 and partly through adjustment port 15 into the fluid outlet 4, so that fluid pressure is not established inside the piston valve 11 and the fluid continues to flow.

When the current supply to the coil 23 is terminated, pilot valve 16 closes port 9 under the urging force of the spring 19, so that the fluid supplied into the inside of the piston valve 11 is discharged exclusively through adjustment port 15 into the outlet opening 4. Therefore, when the diameter of the adjustment port 15 is selected so that the fluid flow through the port 15 does not exceed the fluid flow through the port 12, piston valve 11 is urged to move downwards towards the fluid inlet 4 owing to the pressure increase in the inside space of the valve 11, so that the valve head periphery 13 is brought into a pressing contact with the flange 3 and the rim 5 to stop up the inlet opening 4 and adjustment port 15 to cease the fluid movement.

At the time of the valve closure, the pressure applied to the piston valve 11 and the quantity of the fluid supplied thereinto are changed naturally in function of the fluid pressure of the fluid source, and the quantity of the fluid discharged through the adjustment port 15 is varied simultaneously and in function of the fluid pressure prevailing within the inner space of the piston valve 11. Therefore, the speed of movement of the piston valve 11 is not vitally changed responsive to the fluid pressure fluctuation at the fluid supply source, and the fluid passage is closed in a fixed time interval, depending on the diameter of the adjustment port 15 which can be selected to a desired value.

Especially, according to the present invention, the pressure-reducing port 14 on the upright wall of the piston valve 11 comes to a position facing to the enlarged diameter section 7 of the pressure cylinder, when the piston valve 11 approaches its closure position, as shown in FIG. 7. The fluid is now also discharged through this port 15 so that closure speed of the piston valve 11 is now regulated abruptly. In this case, when the sum of the fluid flow through the ports 14 and 15 is selected to be smaller than the fluid flow through the port 12, the movement of the piston valve 11 is slowed down, but the closure thereof is not hindered. Thus, the fluid passage can be smoothly closed without any water hammering action even when the overall closure time of the valve is reduced. Among the three ports 12, 14, 15 bored on the wall of the piston valve 11, port 15 is not essential to the construction of the present invention. When a prompt valve closure is required, the port 15 may be omitted, provided that the diameter of the pressure-reducing port 14 is selected so that the flow of the fluid through the port 14 is substantially equal to and not larger than that through the port 12. The above operation may also be attained in the case of controlling the fluid supplied under an extremely elevated pressure. Instaed of providing only one port 14, a plurality of such ports may also be provided, on the condition that these ports are of the smaller diameter than the port 14 for satisfying the above requirements on the flow rate. In this case, the operation and effect of the present invention can be improved, since the fluid discharge through these ports 14 and the larger diameter section 7 facing each other occurs promptly and in a shorter time.

When opening the valve, current is supplied to the coil 23 to attract pilot valve 16 towards fixed core 22 to open the port 9. The fluid contained in the inner space of the piston valve is now discharged through port 9, resulting in the lowered pressure prevailing within the inner space of the piston valve 11 which is thus pushed open under the pressure of the fluid and the fluid again starts to flow. When the piston valve is opened slightly, hydraulic communication is simultaneously established through the pressure-reducing ports 14 and the adjustment port 15. Since fluid pressure in the piston valve is reduced by the discharge of the fluid through these ports 14, 15 at the outset and subsequently through the port 15, valve opening occurs far more quickly than in the case of the similar valve having only the central port 9.

Figure 4:
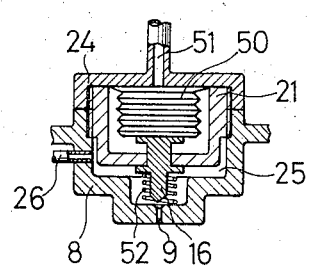
FIG. 4 is a longitudinal sectional view of the reaction type valve embodying the present invention.

In the embodiment shown in FIG. 4, a bellows 50 is provided within a casing 21 mounted in the upper larger diameter space of the top wall 8 of the pressure cylinder 6, and fluid pressure is applied to the bellows 50 through port 51 bored through the protective cover 24, so that a pilot valve 16 fitted to the foremost part of the bellows 50 can be advanced towards or retracted from the port 9. The numeral 52 denotes a spring for returning the pilot valve 16.

Figure 5:
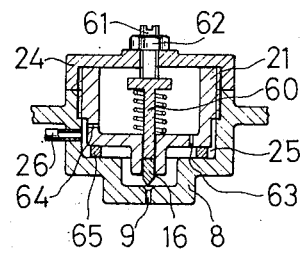
FIG. 5 is a longitudinal sectional view of the thermally responsive type valve embodying the present invention.

In the embodiment shown in FIG. 5, a thermostat 60 is used instead of the bellows 50 of the preceding embodiment. The numeral 61 denotes an adjustment screw, the numeral 62 a lock nut, the numerals 63, 64 denote ports and the numeral 65 denotes a packing.

The excellent valving operation described above is derived simply from undercutting the lower section of the cylinder and boring ports through the wall of the piston valve 11.

Figure 3:
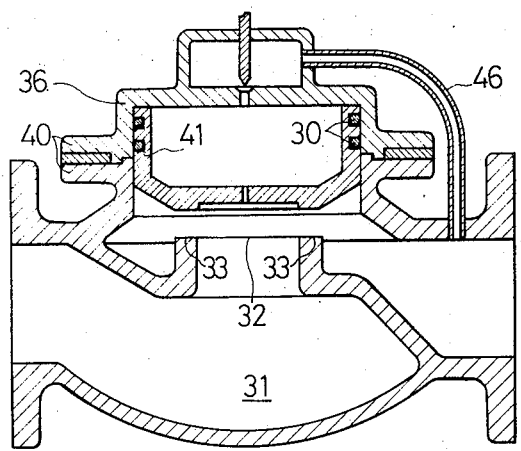
FIG. 3 is a longitudinal sectional view of the conventional valve.

The operation of the inventive valve occurs generally on the basis of the fluid pressure working thereto. The conventional valve of this type shown by way of example in FIG. 3 is so constructed that a valve seat is provided by the flange 33 of the inlet opening 32 and the fluid-tightness of the valve is realized by the sliding contact between the cylinder 36 and the piston valve 41 thus necessitating a close fit between the cylinder 36 and the piston valve 41 and provision of sealing rings 30, which lead naturally to the increased sliding resistance between the two members and consequently to the retarded valve operation under reduced pressure conditions. According to the present invention, the fluid-tightness is assured by the valve head periphery 13, so that a sliding fit between the cylinder and the piston valve may become loose to the extent that the sliding resistance between the two is negligible. Thus, the valve performance occurs smoothly and positively not only under elevated pressure conditions but under reduced pressure conditions. This loose fit between the two sliding parts results in the improved durability of the valve. When a slight clearance is produced between these parts by the wear caused by the prolonged use, the fluid passing through this clearance meets a considerable resistance owing to the narrow clearance width. Thus, the valving operation is not adversely affected with the used of low pressure fluid. In addition, since the fluid-tightness of the valve is assured, by the valve head periphery 13, there is no fear of fluid leakage at the time of valve closure when the fluid is operating under elevated pressure conditions.

As shown in the drawing, the upper and the lower operating surfaces of the piston valve 11 have the same area, but the fluid supplied into the inside of the cylinder through the port 12 acts uniformly on the overall upper surface of the piston valve, while the fluid pressure acting on the valving head is decreased in a direction from the outlet opening 4 towards the peripheral zone, thus giving rise to the valve closure. Therefore, the valve performance occurs smoothly and positively despite fluid pressure fluctuations at the fluid supply source, and the control function of the valve is in no way affected when the valve is mounted in the levelled or inverted position. The valve of the present invention has improved utility and the fluid supplied under a pressure susceptible to considerable fluctuations can be controlled smoothly and positively by means of the same basic value construction. The abutment surfaces of the flange 3 and the rim 5 may also be enlarged to reduce the fluid pressure per unit area and prevent the wear of the operating members for improving the durability and pressure-resistancy of the valve unit.

Since the pilot valve unit can be mounted substantially within the inner space of the piston valve 11, the valve can be made compact. In the conventional valve of this type, a pilot duct 46 is mounted outside of the valve as shown in FIG. 3, or on one side wall of the valve casing (not shown). Therefore, the lower valve casing 31 and the upper component must be assembled together in a certain fixed mounting position, and considerable labor is usually required in assembling these parts together by using matching flanges 40. According to the present invention, since the duct 26 is mounted within the inner space of the piston valve 11 for rotation therewith simultaneously, the valve can be readily assembled or dismounted for inspection and repair operation. The pilot duct 26 may be a small tube of smaller wall thickness as it is mounted in the reduced pressure zone of the valve and is not subjected to the internal fluid pressure. The mechanical strength of the valve can be increased by that the pilot duct is mounted inside the valve unit.

As will become apparent from the foregoing description, the electromagnetic unit can be made small in size and the power consumption can be reduced owing to the provision of the pilot valve to the electromagnetic valve. In the conventional valve of this kind, valving operation is derived from the differential in the operating surface area of the piston and the main valve, and a main valve seat is provided by the flange defining the fluid inlet opening. According to the present invention, the piston valve 11 having the same upper and lower operating surface area and formed with a central port 12 is arranged within the cylinder 6 to make the best of the pressure reduction about the fluid outlet 4 thereby to effect valving operation. Moreover, the sliding fit between the cylinder and the piston valve can be made loose by virtue of the complete fluid-tightness assured by the valve face periphery 13, thus simplifying the valve construction. In addition, the control characteristics under low fluid pressure conditions and fluid tightness proper to the diaphragm type valve and the pressure-resistancy and durability as well as control characteristics under high fluid pressure conditions, all of which are essential to the all-purpose valves, are combined together in the valve of the present invention. The above-mentioned properties of the invention valve that the valve can be opened quickly and closed at a fixed speed with a buffer action are further advantages of the present invention as they add to the utility of the valve. Furthermore, the valve can be made compact, since the pilot unit is built inside the valve, and the manufacture and maintenance of the valve are also facilitated, since there is no limitation is imposed on the relative mounting positions of the component parts.

What is claimed is:

1. Construction of a valve comprising a valve casing 1 having an inlet passage A opening into an inlet opening defined by a flange and communicated with an outlet opening and thence into an outlet passage, said flange serving as a main valve seat and surrounded by an outer rim serving also as a main valve seat; a pressure cylinder having a skirt portion surrounding said outer rim symmetrically with respect said inlet opening and a top wall having generally a convex shape towards the bottom and provided with a central port, said lower edge having an enlarged diameter section; a pilot valve provided within the upper chamber of said cylinder and adapted for opening and closing said port; a casing provided above said pilot valve and defining a chamber connected hydraulically with said port; a piston valve rotatably mounted within the lower chamber of said cylinder and having a valve head and a valve peripheral surface formed with a center port and peripheral ports respectively, said peripheral port being positioned facing to the enlarged diameter section of the cylinder immediately before the closure of the piston valve; and a flexible duct mounted within the piston valve for communication between the chamber and the outlet passage.

* * * * *

UNITED STATES PATENT OFFICE
CERTIFICATE OF CORRECTION

Patent No. 3,807,686          Dated April 30, 1974

Inventor(s) Minoru Furusawa          Page 1 of 3

It is certified that error appears in the above-identified patent and that said Letters Patent are hereby corrected as shown below:

Abstract: Line 1, "Construction of" should be --A--. Lines 2 and 3, "communicated" should be --communicating--. Line 4, "set" should be --seat--. Line 7, "of" should be inserted after --upward--.

Col. 1, line 28, "making the best of" should be --utilizing--. Line 34, first occurrence of "the" should be deleted. Line 40, "resistancy" should be --resistance--. Line 41, "the" should be deleted. Line 45, "resistancy" should read --resistance--, and both occurrences of "and" deleted. Lines 51 and 52, "drawing" should read --drawings--. Line 56, "communicated" should read --communicating--. Line 57, insert "leading" after --4--. Line 58, "$B_1$" should read --B--. Last line, "as" should read --at the--.

Col. 2, line 2, "having" should read --has--. Line 6, "the rim 5 and the flange 3" should be deleted. Line 10, "to" should be deleted. Line 12, "come in" should be inserted before --contact--. Line 12, "pressingly" should be deleted. Line 18, "to" should be deleted. Line 19, "means of" should be inserted after --by--. Line 21, "has" should be --have--. Line 24, "may be" should be --is--. Line 61, "a pressing" should be deleted. Line 62, "stop up" should be --close--. Line 66, "are changed naturally in" should read --change as a--. Line 68, "is" should be deleted.

Col. 3, line 1, "varied" should read --varies--. Line 1, "and in" should read --as a--. Line 4, "responsive" should read --in response--. Line 7, "depending" should read --which depends--. Line 9, "Especially, according to" should read --In the valve of--. Line 11, the second occurrence of "to" should be deleted. Line 14,

UNITED STATES PATENT OFFICE
CERTIFICATE OF CORRECTION

Patent No. 3,807,686   Dated April 30, 1974

Inventor(s) Minoru Furusawa   Page 2 of 3

It is certified that error appears in the above-identified patent and that said Letters Patent are hereby corrected as shown below:

"FIG. 7" should read --FIG. 2--. Line 16, "now regulated abruptly should read --abruptly regulated--. Line 23, "Among" should read --Of--. Line 33, "Instaed" should be --Instead--. Line 35, "on the condition" should be --provided--. Same line, "the" should be --a--.

Col. 4, line 7, delete "simply". Line 10, "inventive" should be deleted. "of the present invention" should be inserted after --valve--. Line 11, before "fluid" insert --action of the--. Same line, after "pressure" insert --thereon--.

Col. 5, line 6, "simultaneous" should be inserted after --for--. Line 7, "simultaneously" should be deleted. Line 9, "operation" should be deleted. Line 13, "by that" should be deleted, and --due to the fact that-- substituted therefor. Line 16, "made" should be deleted. Line 27, "use" should be inserted before --of-- Line 30, "by virtue" should read --because--. Line 34, "proper" should read --characteristic of--.

Col. 6, line 2, "invention" should be deleted. Line 3 should read "valve of the present invention that allow the valve to be opened quickly and closed". Lines 4 and 5, "advantages of the present invention as they add to" should read --advantageous by adding to--.

UNITED STATES PATENT OFFICE
CERTIFICATE OF CORRECTION

Patent No. 3,807,686     Dated April 30, 1974

Inventor(s) Minoru Furusawa

It is certified that error appears in the above-identified patent and that said Letters Patent are hereby corrected as shown below:

Claim of the patent should read as follows:

1. A valve comprising a valve casing having an inlet passage opening into an inlet opening defined by a flange and communicating with an outlet opening and thence into an outlet passage, said flange serving as a main valve seat and surrounded by an outer rim also serving as a main valve seat; a pressure cylinder having a skirt portion symmetrically surrounding said outer rim with respect to said inlet opening and a top wall generally having a convex shape towards the bottom and provided with a central port, the lower edge thereof having an enlarged diameter section; a pilot valve provided within the upper chamber of said cylinder and adapted for opening and closing said central port; a casing provided above said pilot valve and defining a chamber hydraulically connected with said central port; a piston valve rotatably mounted within the lower chamber of said cylinder and having a valve head and a valve peripheral surface formed with a center port and at least one peripheral port, at least one peripheral port being positioned facing the enlarged diameter section of the cylinder immediately before the closure of the piston valve; and a flexible duct mounted within the piston valve for communication between the chamber and the outlet passage.

Signed and Sealed this

Fifth Day of October 1976

[SEAL]

Attest:

RUTH C. MASON
Attesting Officer

C. MARSHALL DANN
Commissioner of Patents and Trademarks